United States Patent Office

3,438,911
Patented Apr. 15, 1969

3,438,911
REDUCTION OF HYDROXYL GROUP CONTENT OF EPOXY RESINS
Bryan Dobinson, Duxford, England, assignor to Ciba Limited, Basel, Switzerland, a Swiss company
No Drawing. Filed July 29, 1965, Ser. No. 475,895
Claims priority, application Great Britain, Sept. 10, 1964, 37,094/64
Int. Cl. C08g 30/02, 30/04, 30/06
U.S. Cl. 260—2                    4 Claims

ABSTRACT OF THE DISCLOSURE

The hydroxyl group content of an epoxy resin is reduced by the reaction in the presence of a small amount of an acid catalyst, such as hydrogen chloride, of an epoxy resin and a vinyl ether of the formula

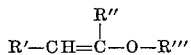

wherein R′ and R″ each is hydrogen or alkyl groups of 1 to 4 carbon atoms, R′″ is an alkyl group with 1 to 4 carbon atoms, and together R′ and R′″ are a polymethylene chain containing at least two and at the most three carbon atoms in the chain.

---

This invention relates to reducing the hydroxyl-group content of epoxy resins, to hardenable compositions containing resins of reduced hydroxyl group content, and to products obtained by curing such compositions.

It is well-known that epoxy resins, i.e. compounds or mixtures of compounds containing on average more than one 1,2-epoxide group per molecule, when prepared by conventional means, generally contain hydroxyl groups, sometimes necessarily formed by the process giving rise to the epoxy resin and sometimes unavoidably formed by partial reaction of the epoxy groups in the resin molecules. For example, the preparation of an epoxy resin by the reaction between a dihydric phenol of formula HO.Z.OH and epichlorohydrin in an alkaline medium, may be represented as follows:

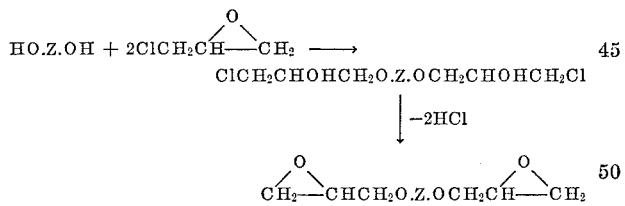

This diglycidyl ether may, however, react with a further molecule of the dihydric phenol thus:

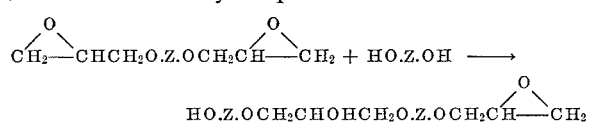

and the terminal phenolic group so produced may react with a further molecule of epichlorohydrin, and the product then undergo dehydrohalogenation as before. It will be seen that the final product may be represented by the average formula:

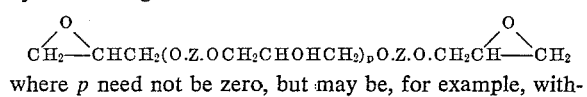

where p need not be zero, but may be, for example, within the range 0.5 to 2, and that the product necessarily contains hydroxyl groups.

The hydroxyl content of commercially-available epoxy resins is often quite high. For example, the epoxy resins commonly employed and prepared from bisphenol A (2,2-bis(p-hydroxyphenyl)propane) and epichlorohydrin, usually contain, if liquid at room temperature, from about 0.6 to 1 gram-equivalent of hydroxyl groups per kg., or, if melting at about 40 to 60° C., about 1.15 to 2 gram-equivalents per kg.

Epoxy resins are also produced by the epoxidation of acyclic or cyclic compounds containing two or more ethylenic bonds with an organic percarboxylic acid. Such resins ordinarily contain a proportion of hydroxyl groups arising from practically unavoidable solvolysis of the epoxide groups.

While in many cases the presence of hydroxyl groups in an epoxy resin is acceptable or sometimes even desirable, it is sometimes preferable to employ an epoxy resin which is susbtantially free from hydroxyl groups. It has been found, for example, that the rise in temperature during the reaction of an epoxy resin which is substantially free from hydroxyl groups with an amine curing agent is considerably less than that occurring when a commercial, hydroxyl-group containing epoxy resin is so reacted. Further, compositions comprising epoxy resins which are substantially free from hydroxyl groups, and either a catalytic hardener or an unaccelerated polycarboxylic acid anhydride hardener, have longer pot-lives.

It has been proposed to prepare hydroxyl group-free epoxy resins by fractional distillation under reduced pressure of the crude resin. This process is, however, inconvenient and requires expensive high-vacuum equipment. Further, when applied to the reaction product of bisphenol A and epichlorohydrin this process gives the substantially free diglycidyl ether a bisphenol A, which is liable to crystallise on being allowed to stand at room temperature, which is undesirable.

It has now been found that the hydroxyl group content of epoxy resins may be substantially reduced by reaction of the hydroxyl groups with certain vinyl ethers.

The present invention accordingly provides a process for effecting a reduction in the hydroxyl group content of an epoxy resin which comprises reacting a hydroxyl group-containing epoxy resin with a cyclic or acyclic vinyl ether of the general Formula I:

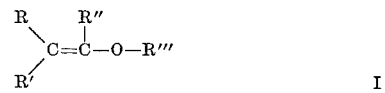

wherein R′ and R″ each represent hydrogen or halogen atoms, or alkyl groups, and either R has the same meaning as R′ and R″, and R′″ represents a monovalent alkyl, aralkyl or aryl group, or R and R′″ taken together represent a divalent aliphatic group, especially a polymethylene chain.

There may thus be used vinyl ethers such as ethyl vinyl ether or n-butyl vinyl ether, propenyl ethers such ethyl propenyl ether, or isopropenyl ethers such as ethyl isopropenyl ether. Preferably there are employed those compounds of Formula I wherein R and R″ each represent hydrogen atoms or alkyl groups and R and R′″ taken together represent a polymethylene chain containing two or three carbon atoms in the chain, e.g. 2,3-dihydrofuran, 5-ethyl-2-methyl-2,3-dihydrofuran, 5-methyl-2,3-dihydrofuran, 3,4-dihydro-2H-pyran, 6-methyl-3,4-dihydro-2H-pyran, 5,6-dimethyl-3,4-dihydro-2H-pyran, 2,2,6-trimethyl-3,4-dihydro-2H-pyran, 2-formyl-3,4-dihydro-2H-pyran and its 5-methyl derivative. The particularly preferred compound of the general Formula I is 3,4-dihydro-2H-pyran.

Reaction between the hydroxyl groups of the epoxy resin and the vinyl ether of Formula I is preferably effected in the presence of a small amount of an acid catalyst. A preferred catalyst is hydrogen chloride (hydrochloric acid gas), but, e.g., sulphuric acid or a cationic exchange resin may be employed. Separation of a liquid or gaseous acid catalyst from the treated resin is generally unnecessary.

The amount of the compound of the Formula I employed is suitably at least enough to react with all the hydroxyl groups of the epoxy resin, and preferably a comparatively large excess is employed to facilitate completion of the reaction. Conveniently a compound of Formula I which is more volatile than the epoxy resin to be treated is employed, so that any unreacted vinyl ether of Formula I may be distilled from the treated epoxy resin and then reused if desired.

The preferred compounds of the general Formula I are, in many cases, liquids of low viscosity, an excess of which can serve as solvent for the resin treated. If desired, however, an inert solvent such as chloroform may be added to the reaction mixture.

Epoxy resins containing hydroxyl groups which may be employed in the new process are, for example, epoxidised cyclic or acylic polyolefins, such as butadiene dioxide, 1,2:4,5-diepoxycyclohexane, esters of 9,10:12,13-diepoxystearic acid, and 3,4-epoxy cyclohexylmethyl 3,4-epoxycyclohexanecarboxylate; basic epoxide resins obtained by the reaction of an aliphatic or aromatic primary amine or disecondary amine, such as aniline or bis(p-methylaminophenyl)methane, with epichlorohydrin and subsequent alkaline treatment; and esters obtainable by the reaction of di- or poly-carboxylic acids with epichlorohydrin or glycerol dichlorohydrin in the presence of an alkali. Such esters may be derived from aliphatic dicarboxylic acids, such as oxalic acid, succinic acid, glutaric acid, adipic acid, pimelic acid, suberic acid, azelaic acid, and sebacic acid, and from aromatic dicarboxylic acids, such as phthalic acid, isophthalic acid, terephthalic acid, naphthalene-2,6-dicarboxylic acid, diphenyl-2,2'-dicarboxylic acid, and ethylene glycol bis-(p-carboxyphenyl)-ether. Specific such esters are, for example, those which correspond to the average formula:

droxyphenyl)methylphenylmethane, bis(p-hydroxyphenyl)tolylmethanes, p,p'-dihydroxydiphenyl, bis(p-hydroxyphenyl)sulphone and especially 2,2-bis(p-hydroxyphenyl)propane. Specific such polyglycidyl ethers are diglycidyl ethers which correspond to the average formula:

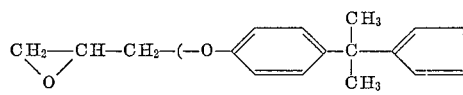

in which Z represents a divalent aromatic hydrocarbon radical, and $p$ represents a small positive whole or fractional number. Especially suitable epoxy resins are those obtained from bisphenol A and epichlorohydrin. Such epoxide resins correspond, for example, to the average formula:

in which $y$ represents a small positive whole or fractional number.

Also within the scope of the present invention are hardenable compositions containing an epoxy resin treated according to the new process hereinbefore defined and a curing agent therefor, and hardened compositions obtained therefrom.

Suitable curing agents include: amines such as aliphatic and aromatic primary and secondary amines, e.g. butylamine, p-phenylenediamine, bis(p-aminophenyl)-methane, ethylenediamine, N,N'-diethylethylenediamine, diethylenetriamine, triethylenetetramine, tetra-ethylenepentamine, Mannich bases, piperidine, guanidine, and guanidine derivatives such as phenylguanidine and diphenylguanidine, dicyandiamide, aniline-formaldehyde resins, polymers of aminostyrenes, polyamides containing amino-groups, e.g. those from aliphatic polyamines and di- or tri-merised unsaturated fatty acids, isocyanates, isothiocyanates, polyhydric phenols, e.g. resorcinol, hydroquinone, and 2,2-bis(p-hydroxyphenyl)propane, phenol-aldehyde resins, oil-modified phenol-aldehyde resins, reaction products of aluminum alkoxides or phenolates with tautomeric reacting compounds of the aceto-acetic ester type, Friedel-Crafts catalysts, e.g. $AlCl_3$, $SbCl_5$, $SnCl_4$, $SnCl_2$, $BF_3$ and their complexes with organic compounds, and phosphoric acid. There may also be used polycarboxylic acids and their anhydrides, e.g. phthalic anhydride, methylendomethylenetetrahydrophthalic anhydride, dodecenyl-

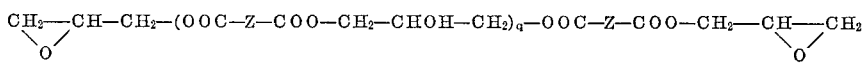

in which Z represents a divalent aromatic hydrocarbon radical, such as a phenylene group, and $q$ represents a small positive whole or fractional number.

Further examples of epoxy resins which may be used in carrying out this invention are the polyglycidyl ethers, obtainble by the interaction of a dihydric or polyhydric alcohol or a dihydric or polyhydric phenol with epichlorohydrin or a related substance, for example glycerol dichlorohydrin, either under alkaline conditions, or in the presence of an acidic catalyst with subsequent alkaline treatment. These compounds may be derived from glycols, such as ethylene glycol, diethylene glycol, triethylene glycol, propane-1,2-diol, propane-1,3-diol, butane-1,4-diol, pentane-1,5-diol, hexane-1,6-diol, hexane-2,4,6-triol or glycerol, and are preferably derived from mono- or poly-nuclear phenols, such as resorcinol, pyrocatetchol, hydroquinone, 1,4-dihydroxynaphthalene, 1,5-dihydroxynaphthalene, phenol-formaldehyde condensation products, bis(p-hydroxyphenyl)methane, bis(p-hysuccinic anhydride, hexahydrophthalic anhydride, hexachloroendomethylenetetrahydrophthalic anhydride, or endomethylenetetrahydrophthalic anhydride or their mixtures, pyromellitic anhydride, or maleic or succinic anhydrides.

Preferred curing agents are alkylene polyamines such as diethylenetriamine and triethylenetetramine, or aromatic diprimary amines such as bis(p-aminophenyl) methane; aromatic dicarboxylic acid anhydrides such as phthalic anhydride and methyl endomethylenetetrahydrophthalic anhydride; and catalytic hardeners such as complexes of boron trifluoride with tertiary amines, and chelates formed from boron trifluoride with 1,3-dicarbonyl compounds.

The compositions of the present invention may contain reactive diluents such as phenyl glycidyl ether, n-butyl glycidyl ether, allyl glycidyl ether, glycidyl acrylate or glycidyl methacrylate. They may also contain fillers, plasticisers, and colouring agents such as asphalt, bitumen, glass fibres, mica, quartz powder, cellulose, kaolin, finely-divided silica such as that available under the registered trademark "Aerosil," or metal powder. The aforesaid compositions may be used as dipping, casting, potting, encapsulating, coating or adhesive resins and the like. The following examples serve to illustrate the invention. "Parts" denotes parts by weight. Deflection temperatures of the cured products were determined according to A.S.T.M. Specification D648–56; flexural strengths and moduli in flexure were determined according to A.S.T.M. Specification D790–61.

Example I

Into a mixture of a hydroxyl group-containing liquid epoxy resin (prepared by the reaction of 2,2-bis(p-hydroxyphenyl)propane with epichlorohydrin in the presence of sodium hydroxide in a conventional manner, and having an epoxide content of 5.10 equiv./kg.) (300 parts) and 3,4-dihydro-2H-pyran (465 parts) was introduced a trace of hydrogen chloride gas. The mixture was then heated at 50° C. for 18 hours. The excess 3,4-dihydro-2H-pyran was distilled off, and the residue filtered while hot through a bed of anhydrous magnesium sulphate. A clear, light-coloured resin was obtained, having an epoxide content of 4.70 equiv./kg. The reduction in epoxide content can be attributed to the introduction of the tetrahydropyranyl grouping. The physical properties of this resin were similar to those of the original liquid epoxy resin, but the resin was shown by its infra-red spectrum to be substantially free of hydroxyl groups.

Example II

Example I was repeated, 1000 parts of the liquid epoxy resin and 927 parts of 3,4-dihydro-2H-pyran being employed. The product obtained was identical with that obtained in Example I.

Example III

A solid epoxy resin (prepared by the reaction of 2,2-bis(p-hydroxyphenyl)propane with epichlorohydrin in the presence of sodium hydroxide and having an epoxide content of 2.5 equiv./kg.) (454 parts) was melted at 120° C. and stirred during the addition thereto over 20 minutes of 3,4-dihydro-2H-pyran (465 parts). The homogeneous solution obtained was cooled to 50° C., and a trace of hydrogen chloride gas was introduced into the solution. The mixture was maintained at 50° C. for 18 hours, filtered, and the excess 3,4-dihydro-2H-pyran distilled off. The residue was a solid, brittle, fusible resin of similar physical properties to the starting material and having an epoxide content of 2.0 equiv./kg., but was shown from its infra-red spectrum to be substantially free of hydroxyl groups.

Example IV

A mixture of a solid hydroxyl-containing polyglycidyl ether having an epoxide content of 5.03 equiv./kg. and derived from a phenolformaldehyde novolak resin having a phenol:foraldehyde ratio of 1.0:0.85 (1000 parts) and 3,4-dihydro-2H-pyran (1000 parts) was treated as described in Example III. The resulting product was a solid, brittle, fusible resin with physical properties similar to those of the untreated epoxy-novolak resin and having an epoxide content of 3.9 equiv./kg. The material was shown from its infra-red spectrum to be substantially free of hydroxyl groups.

Example V

A mixture of the solid epoxy-novolak resin used in Example IV (100 parts), butyl vinyl ether (200 parts) and chloroform (300 parts) was heated to form a homogeneous solution, cooled, and a trace of hydrogen chloride gas introduced. The mixture was heated at 50° C. for 16 hours, and the solvent and excess butyl vinyl ether were then distilled off. The residue (124 parts) was an opaque yellow, slightly sticky solid, shown by its infra-red spectrum to be substantially free of hydroxyl groups. It was found to give satisfactory cure in a moulding composition when cured with a latent Lewis acid catalyst but the moulding was slightly malodrous even after several days' storage. This defect was not noted in similar moulding compositions prepared using the preferred resins, i.e. those treated with 3,4-dihydro-2H-pyran.

Example VI

A trace of hydrogen chloride was passed into a mixture of equal parts by weight of 3,4-dihydro-2H-pyran and a commercial epoxy resin of formula:

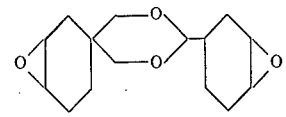

which contained hydroxyl group bearing material. After the mixture had been heated for 16 hours at 50° C., unreacted dihydropyran was removed by distillation. The infra-red spectrum of the residual product had a much weaker band at ca. 3550 cm.$^{-1}$ than did that of the starting material, indicating a substantial reduction of hydroxyl groups.

Gel times of 40 g.-samples of hardenable mixtures of the treated and untreated resins were determined by means of a "Techne" gelation timer, and the results obtained were as follows:

| | | | | |
|---|---|---|---|---|
| Untreated resin (g.) | 100 | | 100 | |
| Treated resin (g.) | | 100 | | 100 |
| Hexahydrophthalic anhydride (g.) | 75 | 75 | 75 | 75 |
| Sodium hexylate (g.) | 6 | 6 | | |
| Gel time at 120° C. (mins.) | 25 | 167 | 186 | 1,209 |

Example VII

A mixture of the hydroxyl-free epoxy resin described in Example I (100 parts) and triethylenetetramine (12 parts) was fully cured after 6 days at 21° C. A 100 g.-sample of the same mixture, kept in a vacuum-jacketed flask at 21° C., spontaneously heated itself to a peak temperature of 217° C. after 75 minutes. 100 g. of a similar mixture prepared from untreated resin gave the same peak temperature after only 35 minutes.

A 50 g.-sample of the mixture containing the treated resin in an open glass vessel cured smoothly with a peak temperature of 87° C., while a sample of a mixture prepared from untreated resin gave a brown, discoloured casting with a recorded peak temperature of 187° C. The physical properties of castings prepared from the hydroxyl-free resin were: deflection temperature, 55° C.; flexural strength, 780 kg./sq.cm.; and modulus in flexure, 35,200 kg./sq.cm. Castings prepared in a similar manner from the unmodified, hydroxyl-containing epoxy resin had a deflection temperature of 58° C., a flexural strength of 670 kg./sq.cm. and a modulus in flexure of 40,700 kg./sq.cm.

Example VIII

A mixture of the hydroxyl-free epoxy resin described in Example I (100 parts) and bis(p-aminophenyl) methane (25 parts) was cured at 80° C. for 16.5 hours. Castings with the following physical properties were obtained: deflection temperature, 107° C.; flexural strength, 1210 kg./sq.cm.; modulus in flexure, 34,500 kg./sq.cm. A 100 g.-sample of the above mixture, cured in a vacuum-jacketed flask at 70° C., heated spontaneously to 184° C. after 100 minutes. A sample of a similar mixture prepared from untreated resin gave a maximum temperature of 219° C. after 43 minutes.

Example IX

A mixture of the hydroxyl-free liquid epoxy resin described in Example I (100 parts), hexahydrophthalic anhydride (74 parts) and N-benzyldimethylamine (2 parts)

was cured for 12 hours at 100° C. to give castings having a deflection temperature of 117° C.

Example X

A mixture of the hydroxyl-free liquid epoxy resin described in Example I (100 parts) and the boron trifluoride-ethylamine complex (4 parts) was cured at 100° C. for 6 hours and then at 140° C. for 18 hours to give a casting with the following properties: deflection temperature, 172° C.; flexural strength, 880 kg./sq.cm.; and modulus in flexure, 31,700 kg./sq.cm. Castings prepared in a similar manner from the unmodified, hydroxyl-containing epoxy resin had a deflection temperature of 171° C., a flexural strength of 703 kg./sq.cm., and a modulus in flexure of 34,400 kg./sq.cm.

Example XI

A mixture of the hydroxyl-free solid epoxy resin described in Example III (100 parts) and phthalic anhydride (30 parts) cured to give tough castings. A 100 g.-sample of the mixture, cured at 120° C. in a vacuum-jacketed flask, heated spontaneously to a peak temperature of 131° C. after 4 hours, 20 minutes. A similar sample of a mixture prepared from untreated resin gave a peak temperature of 173° C. after 2 hours, 40 minutes.

Example XII

A moulding composition containing the hydroxyl-free epoxy-novolak resin prepared as described in Example IV (157 parts), zinc stearate (5 parts), china clay (175 parts), 6 mm.-glass fibre (150 parts) and the chelate of boron trifluoride with aceto-acetanilide (6.3 parts) was compression-moulded at 165° C. and cured in under 1 minute. The moulding had a dielectric constant (1000 c.p.s.) of 5.09, a power factor of 0.008 and exhibited an increase in weight of 0.109% after immersion in water for 24 hours at room temperature, and of 0.143% after similar immersion for 10 minutes at 100° C. The moulding composition still flowed well after storage for 3 months at room temperature or for 48 hours at 60° C. A similar moulding composition prepared from untreated epoxy-novolak resin did not exhibit satisfactory flow properties after storage under similar conditions.

What is claimed is:

1. Process for lowering the hydroxyl group content of an epoxy resin containing on average more than one 1,2-epoxide group per molecule which comprises reacting in the presence of a small amount of an acid catalyst and at a moderately elevated temperature a hydroxyl group-containing epoxy resin with a vinyl ether of the formula

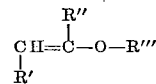

wherein R' and R" each represents members selected from the group consisting of hydrogen and alkyl groups with 1 to 4 carbon atoms, R''' represents an alkyl group with 1 to 4 carbon atoms, and together R' and R''' represent a polymethylene chain containing at least two and at the most three carbon atoms in the chain said vinyl ether being present in an amount at least sufficient to react with all the hydroxyl groups of said epoxy resin.

2. Process as claimed in claim 1, wherein the vinyl ether is 3,4-dihydro-2H-pyran.

3. Process as claimed in claim 1, wherein the acid catalyst is hydrogen chloride.

4. Process as claimed in claim 1, wherein the vinyl ether used is more volatile than the epoxy resin and is employed in amount in excess of that required to react with all the hydroxy groups of the epoxy resin and the excess of the said vinyl ether is distilled from the treated epoxy resin after the completion of the reaction.

References Cited

Lee et al.: Epoxy Resins, p. 15, relied on McGraw-Hill Book Co. Inc., New York, 1957.

WILLIAM H. SHORT, *Primary Examiner.*

F. PERTILLA, *Assistant Examiner.*

U.S. Cl. X.R.

260—47, 51